United States Patent Office 3,305,448
Patented Feb. 21, 1967

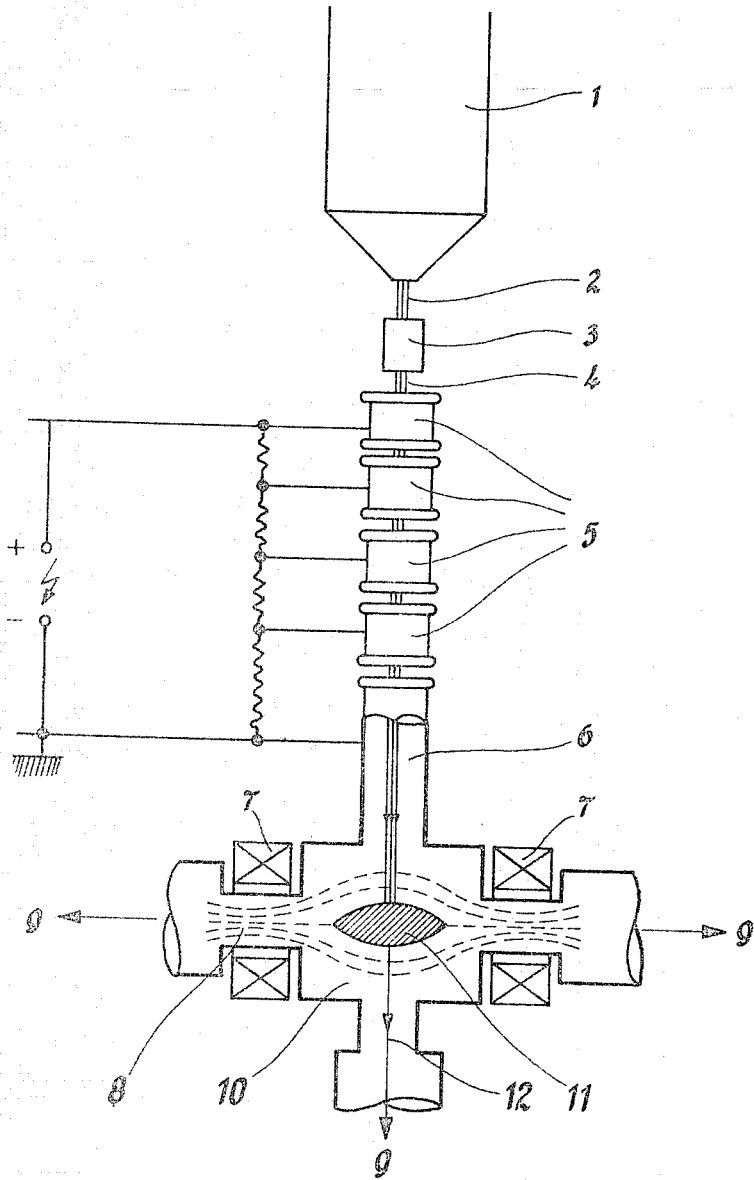

3,305,448
INTRODUCTION OF FUEL INTO A THERMO-
NUCLEAR REACTOR
Erwin Willy Becker, Karlsruhe, and Wolfgang Henkes,
Leopoldshafen, near Karlsruhe, Germany, assignors to
Kernreaktor Bau- und Betriebs-Gesellschaft m.b.H.,
Karlsruhe, Germany, a corporation of Germany
Filed May 6, 1963, Ser. No. 278,806
Claims priority, application Germany, May 12, 1962,
K 46,723
7 Claims. (Cl. 176—5)

This invention relates to improvement in the introduction of fuel into a thermonuclear reactor. The invention more particularly relates to an improved method for introducing and accelerating nuclear fuel into a thermonuclear reactor for the generation of a high temperature plasma.

Thermonuclear reactors are known in which high energy nuclear fuel beams consisting of accelerated, charged atoms or molecules of hydrogen or helium isotopes are utilized to generate a high temperature plasma upon ionizing impact in the reactor. The fuel beams are generated by electrical acceleration of ionized nuclear fuel in atomic or molecular form having a minimal, specific charge of 0.33 elementary charge per atom. The lower limit of the specific charge was dictated by the number of atoms which could be collectively charged as a unit. Thus, for example, in connection with hydrogen, it was not possible to give an elementary charge to a unit containing more than 3 hydrogen atoms unless the hydrogen atoms where bound with other atoms as for example in the form of a compound, such as a hydrocarbon.

The requirement of the minimum specific charge, however, necessitated a subsequent partial or complete electrical neutralization of the fuel by change in charge or division of the fuel by dissociation into a charged and uncharged portion. In the latter case, the charged portion of the beam could be separated from the neutral portion by electrical or magnetic fields. This removal or reduction of the undesired charge after the acceleration process, however, caused considerable losses.

In order to avoid these losses, it has been proposed in the case of nuclear fuel consisting of hydrogen isotopes to effect the acceleratioin using a substantially lower specific charge which would thus make subsequent removal of the charge unnecessary. For this purpose, the hydrogen forming the fuel had to be integrated into larger molecules, such as hydrocarbons which necessitated the presence of foreign elements. These foreign elements, as for example, the carbon atoms, however, cause considerable energy losses, thus greatly reducing the efficiency of the equipment, and even making it impossible to obtain the desired high plasma temperatures.

One object of this invention is to allow the introduction of the nuclear fuel for the acceleration in the thermonuclear reactor with a lower specific electrical charge so that subsequent charged removal becomes unnecessary or may be effected with much lower losses.

A further object of the invention is the introduction of the nuclear fuel into the thermonuclear reactor after acceleration with a low specific charge and without the necessity of foreign atoms.

These and still further objects will become apparent from the following description read in conjunction with the drawing which diagrammatically shows a thermonuclear reactor utilized in accordance with the invention.

In accordance with the invention, it has surprisingly been discovered that the above-mentioned disadvantages may be avoided and that nuclear fuel beams of high kinetic energy and low specific charge may be generated without the conventional more or less high losses if the nuclear fuel is converted into a finely divided condensed form consisting of molecule or atom clusters or the like connected by Van der Waals forces, and charged in this form with a low specific electrical charge for the electrical acceleration in this charged form to a beam of high kinetic energy. The clusters may be given a low specific electrical charge which is large enough, on the one hand, to permit efficient electric acceleration, and yet small enough, on the other hand, to require no subsequent removal of the charge in most cases. Quite unexpectedly, the electrical charges induced on these clusters are not removed therefrom by the high electrical fields necessary for economic acceleration.

The low specific electrical charge given the clusters in accordance with the invention is a specific charge of less than 0.33 elementary charges per atom and the high kinetic energy to which the charged clusters are accelerated is a directed energy of motion exceeding the unidirected thermal energy by at least the factor of 100 at room temperature, i.e. exceeding 2–5 e.v./atom.

The condensing of the fuel into the form of clusters connected by the Van der Waals forces is effected in the conventional manner, as for example, by expansion at low temperatures in a high vacuum. Thus, for example, the nuclear fuel consisting of the hydrogen or helium isotopes is brought to a temperature of $-180°$ C. or lower, and preferably to a temperature below $-250°$ C. and at this low temperature expanded in a high vacuum, as for example, through a nozzle resulting in the formation of the clusters.

The clusters are then charged in the conventional manner using, for example, an ion source and the charged clusters accelerated in the conventional manner by an electrical field with the high temperature plasma being generated upon impact of the thus accelerated beam.

It is preferable to control the condensation of the clusters, and the charging thereof in such a manner that at least 10 molecules or atoms are clustered in condensed form for every elementary charge. In this connection, it may be pointed out that the condensation for the purposes of this invention is understood to mean a general clustering of particles existing in the gaseous phase in a stable form. In the case of hydrogen isotopes, these are, for example, the molecules consisting of two atoms and in connection with helium isotopes and many metals, atoms are involved.

It is possible to effect the electrical charging by ion or electron bombbardment or with the use of electromagnetic alternating fields. After the condensing and the electrical charging, the nuclear fuels may be accelerated in electrostatic as well as in electromagnetic fields. Particularly favorable results may be obtained with accelerations to an energy of at least 100 e.v./atom. It is, however, possible to even obtain good results at energies in order of several e.v./atom in certain cases.

While the removal of the low specific electrical charge is not necessary, it may be desirable in certain applications to remove this charge in part or completely. This charge removal is effected in the conventional manner and is connected with much less of a loss than removing the high specific charge of nuclear fuels accelerated in the prior known manner in atomic or molecular form.

Referring to the embodiment shown in the drawing, 1 represents a cryostat containing a beam generating system, as is described in Zeitschrift für Naturforschung, vol. 17a (1962), p. 433, FIG. 1. The nuclear fuel may be condensed into the clusters in this device, and for example hydrogen isotope may be condensed into $D_2$-clusters and the beam of $D_2$-clusters thus formed, designated as 2, is passed through an ion source 3, as for example as well-known electron impact source. The clusters are thus charged with a positive charge, the charge being a low specific electrical charge of less than 0.33 elementary charges per atom, and the thus charged clusters emerge at 4 and pass through the accelerator electrodes 5 where the same are accelerated by the electrical field formed across these electrodes by the high voltag applied from a high tension (HT) supply line. The clusters with the high kinetic energy designated 6 pass through the thermonuclear reactor as for example a so-called "mirror machine" c.f.s. Glasstone, R. H. Lovberg: "Controlled Thermonuclear Reactions," Van Nostrand, New York, 1960, p. 61. The machine is provided with the coils 7 for generating the magnetic field, whose lines of flux are shown at 8 and with the vacuum container 10, which is evacuated by high vacuum pumps connected at 9. The accelerated $D_2$ clusters are partially trapped in the reactor volume formed in the vacuum container 10 by ionizing impact and thus build up the high temperature plasma 11. The untrapped clusters 12 leave the reactor.

As illustrated by FIG. 1, page 433 in Zeitschrift für Naturforschung, deuterium gas nuclear fuel is introduced into a beam generating cryostat and is expanded therein through a nozzle. The expanded stream of fuel from the nozzles passes through a first diaphragm and thence through a second diaphragm, from which it emerges as a beam of condensed clusters.

Typical operation conditions of the beam generating system are:
   Diameter of the nozzle—0.5 mm.
   Diameter of 1st diaphragm—0.3 mm.
   Diameter of 2nd diaphragm—1.5 mm.
   Temperature of the nozzle—20° Kelvin
   Inlet pressure of the deuterium gas in the nozzle—500 torr
   Pressure between nozzle and first diaphragm— $1 \times 10^{-1}$ torr
   Pressure between 1st and 2nd diaphragm— $1 \times 10^{-3}$ torr
   Pressure in the vacuum container below— $1 \times 10^{-9}$ torr Typical operating conditions of the ion source are:
   Accelerating voltage for electrons—100 v.
   Electron current—1.1 A.

Typical operating conditions of the accelerators are:
   Voltage of power supply—10 mv.

The minimum size of clusters to be used according to this invention shall be 2 molecules of hydrogen isotopes, e.g. at least 4 atoms per cluster or, in the case of helium, 3 atoms per cluster.

The upper limit given by the voltage of power supplies presently available amounts to 100,000 atoms per singly charged cluster. Consequently, the minimum specific charge per atom will be $10^{-5}$ elementary charges per atom.

The preferred size of clusters depends on the power supply to be used and will be, for example, 1000 atoms per singly charged cluster if the desired energy per atom is to be 10000 e.v. with a power supply of 10 mv. In this case the preferred specific charge per atom will be $10^{-3}$ elementary charges per atom.

The pressures to be used in the beam generating system are state of the art and may be chosen for example as described in Zeitschrift für Naturforschung, vol. 17a (1962) p. 432.

The partial removal of the charge after acceleration may be accomplished by passing the beam through a short zone of very strong electric or magnetic field and afterwards deflecting the dissociated charges.

We claim:
1. In a process wherein a nuclear fuel containing atoms of at least one member of the group consisting of the elements hydrogen, helium, and their isotopes, is accelerated into a thermonuclear reactor for generating high temperature plasma, the improvement which comprises converting the fuel into finely divided condensed clusters of atoms connected by Van de Waals forces, electrically charging said clusters with a low specific charge of less than 0.33 elementary charges per atom, and electrically accelerating the charged clusters to a high kinetic energy level for the generation of high temperature plasma in the reactor upon impact.

2. Improvement according to claim 1 wherein some of the atoms in the clusters are combined as molecules.

3. Improvement according to claim 2 wherein the clusters contain at least 10 particle units per elementary charge, with each molecule being counted as a single particle unit, and each uncombined atom being counted as a single particle unit.

4. Improvement according to claim 1 wherein the charged clusters are electrically accelerated to at least 100 e.v./atom.

5. Improvement according to claim 2 wherein the charged clusters are electrically accelerated to at least 100 e.v./atom.

6. Improvement according to claim 1 which includes removing at least a portion of the residual specific electric charge after said acceleration.

7. In combination:
  (a) a cryostat having a nuclear fuel beam generating system for generating condensed clusters of nuclear fuel atoms and molecules connected by Van der Waal forces;
  (b) an ion source responsive to the clusters generated by said cryostat and operatively connected therewith so as to charge said clusters with a specific electrical charge of less than 0.33 elementary charges per atom;
  (c) an electrical accelerator operatively connected with said ion source and responsive to accelerate the charged clusters produced thereby; and,
  (d) a thermonuclear reactor operatively connected to said electrical accelerator to receive the accelerated and charged clusters therefrom, and responsive to the impact of said clusters to form a high temperature plasma therefrom.

References Cited by the Examiner

UNITED STATES PATENTS

| | | | |
|---|---|---|---|
| 3,030,543 | 4/1962 | Luce | 176—5 |
| 3,075,115 | 1/1963 | Flowers et al. | 176—5 |
| 3,093,765 | 6/1963 | Prevot | 176—5 |

FOREIGN PATENTS

| | | |
|---|---|---|
| 1,107,842 | 5/1961 | Germany. |

OTHER REFERENCES

Controlled Thermonuclear Reactors, by Samuel Glasstone et al., D. Van Nostrand Co., New York, 1960, pp. 391–402, 60.

REUBEN EPSTEIN, *Primary Examiner.*